(12) United States Patent
Amato et al.

(10) Patent No.: US 9,958,110 B2
(45) Date of Patent: May 1, 2018

(54) NO-DRILL PERMANENT-LIKE SURFACE MOUNTING DEVICE

(71) Applicant: AmLee Innovations Corp, North Richland Hills, TX (US)

(72) Inventors: Fredrick J. Amato, Fort Worth, TX (US); Matthew Lee Jackson, Keller, TX (US); Charles A. Lee, North Richland Hills, TX (US)

(73) Assignee: Amlee Innovations Corp, North Richland Hills, TX (US)

( * ) Notice: Subject to any disclaimer, the term of this patent is extended or adjusted under 35 U.S.C. 154(b) by 0 days. days.

(21) Appl. No.: 14/011,736

(22) Filed: Aug. 27, 2013

(65) Prior Publication Data
US 2014/0060724 A1 Mar. 6, 2014

Related U.S. Application Data

(60) Provisional application No. 61/696,178, filed on Sep. 2, 2012.

(51) Int. Cl.
| | |
|---|---|
| *F16M 13/02* | (2006.01) |
| *F16M 7/00* | (2006.01) |
| *A47B 91/02* | (2006.01) |
| *A47B 91/08* | (2006.01) |
| *B29C 65/00* | (2006.01) |
| *B29C 65/48* | (2006.01) |
| *B29C 65/76* | (2006.01) |
| *B29C 65/72* | (2006.01) |
| *B29C 65/56* | (2006.01) |

(52) U.S. Cl.
CPC .......... *F16M 13/02* (2013.01); *A47B 91/024* (2013.01); *A47B 91/08* (2013.01); *F16M 7/00* (2013.01); *B29C 65/48* (2013.01); *B29C 65/561* (2013.01); *B29C 65/72* (2013.01); *B29C 65/76* (2013.01); *B29C 66/47* (2013.01); *Y10T 156/10* (2015.01)

(58) Field of Classification Search
CPC ....... F16B 11/006; B29C 65/00; B29C 65/48; B29C 65/56; B29C 65/561; B29C 65/562; B29C 65/72; B29C 65/76; B29C 66/00; B29C 66/40; B29C 66/47
USPC ......... 156/60, 66, 71, 91, 92, 152, 247, 249, 156/289, 297, 299, 701, 709, 711, 714; 248/200, 205.1, 205.3
See application file for complete search history.

(56) References Cited

U.S. PATENT DOCUMENTS

| | | | | |
|---|---|---|---|---|
| 3,850,392 A | * | 11/1974 | Gassaway | E05B 73/0082 248/553 |
| 4,830,908 A | * | 5/1989 | Nakajima | B32B 5/18 156/79 |
| 4,893,777 A | * | 1/1990 | Gassaway | E05B 73/0082 211/8 |
| 5,335,892 A | * | 8/1994 | Busch | E05B 73/0082 156/71 |
| 5,487,523 A | * | 1/1996 | Ingram | E05B 73/0082 248/205.3 |
| 6,124,016 A | * | 9/2000 | Weil | B29C 37/0085 156/297 |

(Continued)

*Primary Examiner* — Philip C Tucker
*Assistant Examiner* — Brian R Slawski

(57) ABSTRACT

This invention relates to the configuration of a mounting base and a method of mounting objects to hard surfaces using the combination of at least one anchoring screw, bolt, rod, or assembly; one mounting base; and one chemical bonding material to perform the anchoring function.

19 Claims, 4 Drawing Sheets

(56) References Cited

U.S. PATENT DOCUMENTS

| | | | |
|---|---|---|---|
| 7,299,668 B1* | 11/2007 | Lu | E05B 73/0082 70/14 |
| 8,777,050 B1* | 7/2014 | Joshi | B65D 88/16 220/666 |
| 2009/0016843 A1* | 1/2009 | Komsitsky et al. | 411/105 |
| 2010/0018959 A1* | 1/2010 | Wilson | 219/202 |
| 2011/0061788 A1* | 3/2011 | Stanley | E04D 13/1407 156/66 |

* cited by examiner

NO-DRILL PERMANENT-LIKE SURFACE MOUNTING DEVICE

CROSS-REFERENCE TO RELATED APPLICATION

This application claims priority to provisional patent application Ser. No. 61/696,178, filed on Sep. 2, 2012.

FEDERALLY SPONSORED RESEARCH OR DEVELOPMENT

Not Applicable

FIELD OF THE INVENTION

This invention relates in general to the mounting of equipment and other devices that are desirable to affix to surface areas in a permanent or permanent-like manner, and particularly to a mounting base and method of mounting equipment and other devices of any variety of grade, duty, or weight, in a permanent-like manner which also allows a means of removing and re-using the mounting apparatus in similar subsequent applications without permanently or materially damaging the mounted surface.

BACKGROUND OF THE INVENTION

Mounting equipment and other devices (for example but not limited to, shop or kitchen equipment, shelving, safes, etc.) typically require that anchoring devices be screwed, nailed, drilled, or otherwise permanently fixed into the surface to be mounted against. There are many solutions available to mount items of varying grade, duty, or weight, but all current solutions require that an anchoring device penetrate into the mounted surface, which permanently damages, weakens, marks, scars, and otherwise destroys, or renders less useful, the immediate area whereby the anchor penetrates.

Further, items that get mounted onto surfaces frequently need to be removed from the mounted area or relocated. Current devices and methods to mount items in this fashion do not consider or allow for the removal of the anchoring mechanism without materially damaging the mounted surface. Various patents disclose devices and methods to mount or anchor items to flat surfaces, but improvements are desired. For example, a common means of anchoring a large shop tool to the floor is to drill a series of large holes several inches deep into concrete, insert a concrete anchoring bolt, apply a very large amount of outward and/or upward pressure within the drilled hole of the concrete by screwing down the anchor bolt into the concrete hole. This method weakens the concrete surface and makes it vulnerable to a variety of subsequent damage. And when the shop tool needs to be relocated, the anchoring bolt must be either ripped out of the floor (further damaging the surface) or cut flush to the floor, thus rendering that specific area less useful or desirable for future uses.

Also, many items that need to be mounted to flat surfaces do not get mounted because either the existing mounting options require too much time and resources to complete, or their owners do not desire to damage the flat surfaces required to mount the items. Lack of a reliable mounting solution that addresses customers' desire to quickly mount items while also allowing for a means to quickly remove or relocate the mounting apparatus when needed, ends up raising a variety of otherwise low to negligible risks (if the said equipment had been mounted), including risk of injury, death, damage, and theft. For example, safes need to be mounted to a strong surface in order to effectively reduce the risk of theft. But many owners of safes do not anchor them at all because of the high degree of time and resources needed to install them, as well as the destructive nature of conventional mounting options. This scenario also applies to many types of equipment that should be mounted but generally do not get mounted. For example, air compressors, grinders, drill presses, sanders, benches, picnic tables, event tents and awnings often fall into this scenario.

SUMMARY OF THE INVENTION

In this invention, a mounting base anchors a variety of mountable objects to solid surfaces in a permanent-like fashion through the use of a chemical bonding compound applied to the base's bottom side, and through the use of a variety of attaching mechanisms applied to the base's top side. However, this invention also allows the mounting base to be removed and reused if desired, and thus the mountable objects as well, without permanently damaging or destroying the mountable objects or flat surfaces whereupon the mounting occurred.

The invention has advantages beyond traditional mechanical anchoring products and methods. Some advantages, without limitation, are as follows. This invention eliminates the need permanently damage a finished or unfinished surface (for example but not limited to, concrete, steel, brick, wood, rock, metal, plastic, or tile) when a heavy or large object or device needs to be mounted upon that surface. Since the mounting base is secured with chemical bonding material, the mounted surface area does not get penetrated into by anything, and is thus preserved from material. Contrast this feature with conventional mounting technology, which for example, tends to require mounting screws or bolts to be anchored, hammered, or otherwise penetrated into the surface in order to perform their anchoring and fastening function, and thus permanently damaging that same surface.

This invention also allows a mounted surface to be reused in the future when a mounting base or mounting assembly is removed, just as if a device had never been mounted upon it. Since the mounting base does not penetrate into the mounted surface area, and can be easily removed with chemical bond-breaking methods, the structural integrity of the mounted surface area is preserved and can be reused for any applicable reason in the future. Contrast this with conventional mounting technology, which leaves surface damage (for example but not limited to, holes, cracks, gashes, gouges, tears, rips, bolts, screws, nails, rods) on the mounted surface area when the mounted object is removed. Often, this surface area damage prevents that immediate and surrounding surface area from being reused again in the future, and thus reduces the overall utility of that area. For example, if a floor-mounted piece of equipment in a work shop needs to be relocated, conventional mounting technologies will leave damage on the surface area whereby the equipment was mounted. No future equipment can be mounted at this location due to the weakened or otherwise compromised concrete, and is thus no longer safe or fit to be used again for this fashion.

BRIEF DESCRIPTION OF THE DRAWINGS

Figure 1:
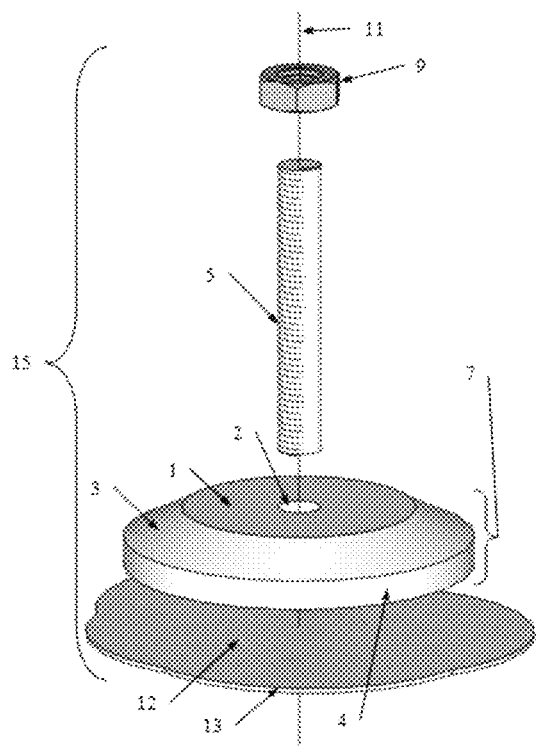

Having thus described the invention in general terms, reference will now be made to the accompanying drawings, which are not necessarily drawn to scale, and wherein:

FIG. 1 is a perspective view of a first embodiment of a mounting base 4 in accordance with this invention, shown in-position within an exploded component view of a mounting base assembly 15.

Figure 2:
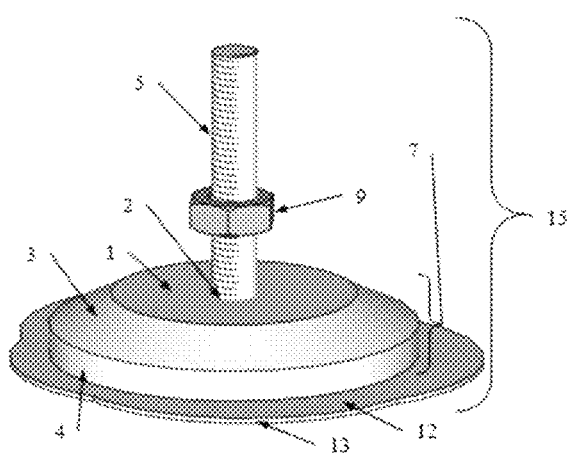

FIG. 2 is a view of the mounting base 4 and mounting base assembly 15 of FIG. 1, showing the base and assembly in a fully-installed configuration.

Figure 3:
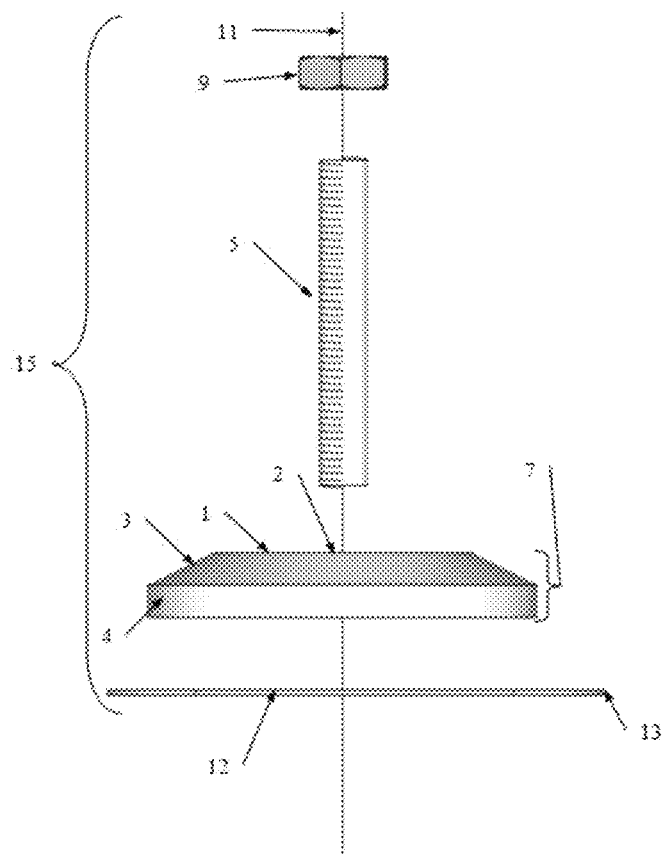

FIG. 3 is a front view of FIG. 1.

Figure 4:
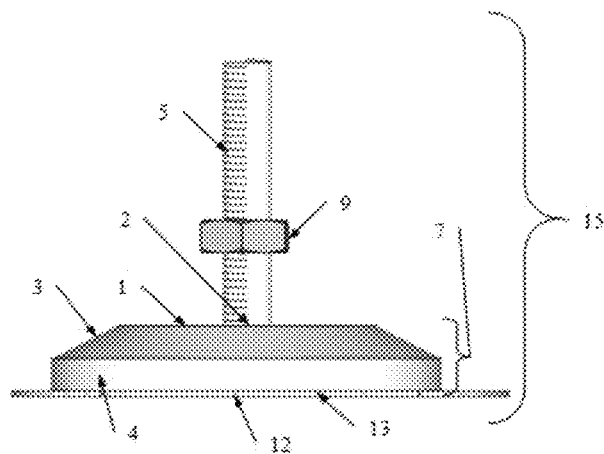

FIG. 4 is a front view of FIG. 2.

Figure 5:
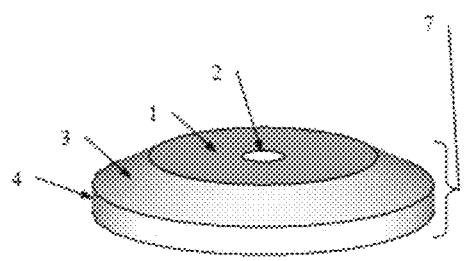

FIG. 5 is a perspective view of the mounting base 4 from FIG. 1.

Figure 6:
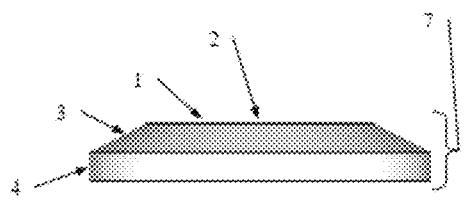

FIG. 6 is a front view of the mounting base 4 from FIG. 1.

Figure 7:
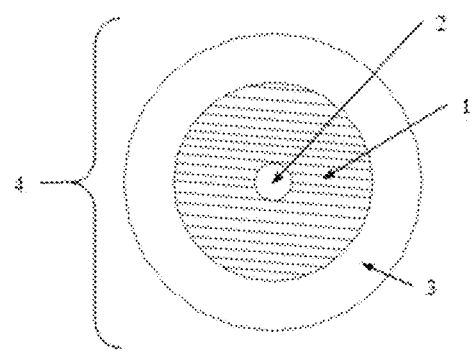

FIG. 7 is a top view of the mounting base 4 from FIG. 1.

Figure 8:
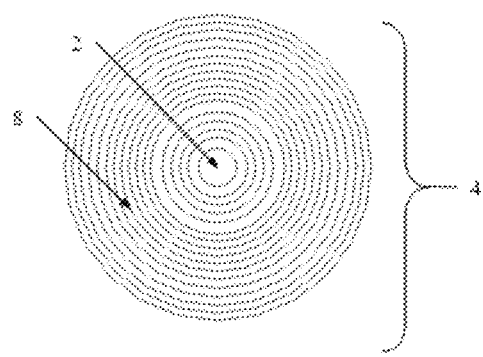

FIG. 8 is a bottom view of the mounting base 4 from FIG. 1.

Figure 9:
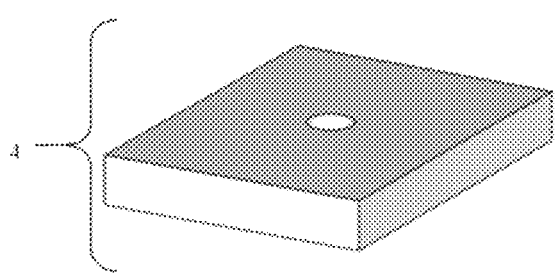

FIG. 9 is an example of an alternate configuration of the mounting base 4 from FIG. 1.

Figure 10:
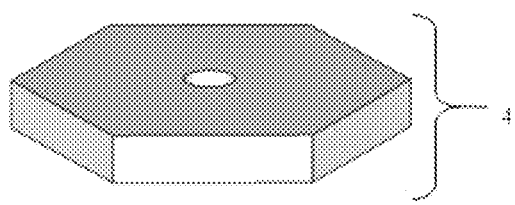

FIG. 10 is a second example of an alternate configuration of the mounting base 4 from FIG. 1.

Figure 11:
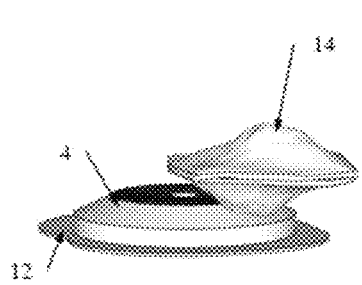

FIG. 11 is a perspective view of the mounting base 4 from FIG. 1 in an installed configuration with chemical bonding material 12 applied to the bottom of the mounting base, and extreme cold 14 being applied to the mounting base.

Figure 12:
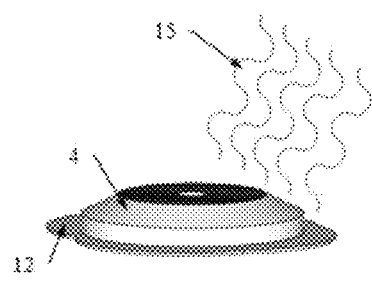

FIG. 12 is a perspective view of the mounting base 4 from FIG. 1 in an installed configuration with chemical bonding material 12 applied to the bottom of the mounting base, and extreme heat 15 being applied to the mounting base.

Figure 13:
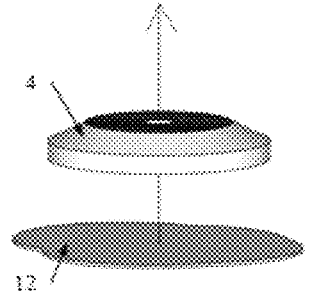

FIG. 13 is a perspective view of the mounting base 4 from FIG. 1 that has been lifted off of the chemical bonding material 12.

Figure 14:
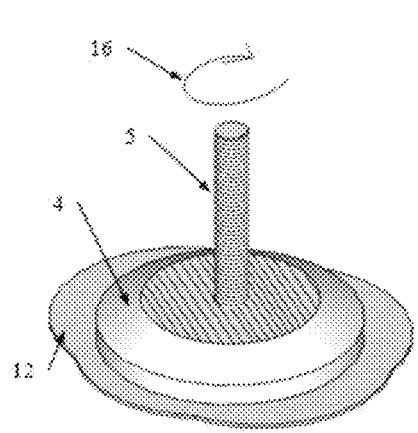

FIG. 14 is a perspective view of the mounting base 4 from FIG. 1 in an installed configuration with chemical bonding material 12 applied to the bottom of the mounting base, and an anchoring screw, bolt or rod 5 mounted within the top-part of the mounting base anchoring hole. The anchoring screw, bolt, or rod is being turned in a tightening fashion 16, and leveraging the resulting load force from the anchor screw, bolt or rod to break the chemical bond.

Figure 15:
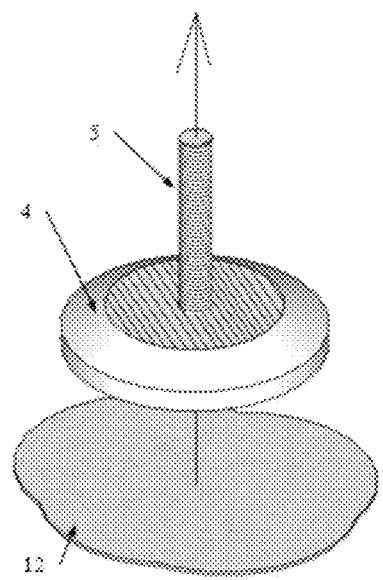

FIG. 15 is a perspective view of the mounting base 4 from FIG. 1 with an anchoring screw, bolt or rod 5 mounted within the top-part of the mounting base anchoring hole. The mounting base has been lifted off of the chemical bonding material 12 by utilizing the methods depicted in FIG. 11, 12 or 14.

DETAILED DESCRIPTION OF THE INVENTION

The present inventions now will be described more fully hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

Referring to FIG. 1, a mounting assembly 15 is shown with a mounting base 4 containing at least one mounting hole, constructed in accordance with this invention. The mounting assembly 15 (comprising at least one mounting base 4, chemical bonding material 12, anchoring screw, bolt, or rod 5; and/or at least one mounting nut, washer or fastening mechanism 9) may be comprised of a number of different types, composition, and designs and the particular ones shown are for example only. The chemical bonding material 12 is also affixed to a solid surface area (not shown). Different attachments, equipment or other devices (all not shown) may also be affixed to the mounting base 4 through a variety of means. One means of affixing devices to the mounting base 4 is illustrated in the included Figures, which employs an anchoring screw, bolt or rod 5 and at least one mounting nut, washer or fastening mechanism 9 as illustrated. For illustrative purposes, each of the mounting assembly 15 components has been aligned along the center line 11 of the mounting base 4. This provides an example of how the mounting assembly 15 components expand apart, and fit together into an assembly. Though illustrated along a center line 11, each anchor hole 2 and related components do not necessarily need to align with the mounting base center line 11, but can also align with any point on the mounting base 4.

When installed, the mounting assembly 15 can be subjected to a variety of different forces or combinations of forces: some of which include compression loads, tension loads and shear loads; all of which relate to the objects that are mounted upon the mounting assembly 15 and the environmental conditions by which the mounting assembly 15 and mounted solid surface are subjected to. Though any material may be used to construct the components of mounting assembly 15, careful consideration must be made in selecting the materials used so that each component can withstand the different forces by which they will be subjected to when installed. In the configuration illustrated in the related Figures, steel was used as the designed material, though this may change to meet different requirements.

The outer dimensions of mounting base 4 can be of any shape or size, currently illustrated in a circular configuration, with a tapered edge 3. The height 7 of mounting base 4 can be of any height, though its minimum height needs to allow for enough anchoring strength for the bottom part of anchor bolt or rod 5 to reliably secure the objects or assemblies (not shown) that will be mounted upon the mounting base 4. In its current configuration as illustrated in the related Figures, the mounting base 4 is ½ inch high. The width of mounting base 4 can be of any measure, and be configured into any shape. For example, the related illustrations show the base configured in a circular shape that is 2 and ¾ inches in diameter, but can be any shape or size. In FIGS. 9 and 10, two examples of alternate configurations of mounting base 4 are illustrated. But these alternate base configurations (shape, size, material composition, bottom and top markings and patterning, etc.) can be of any variability. Though not required, mounting base 4 may also contain one or more tapered edge 3 of any angle, length, arch, or other pattern. A tapered edge 3 may begin from any corner or both corners of mounting base 4, and may extend to any length or shape necessary to achieve the desired characteristics. For example, in the related illustrated Figures the tapered edge 3 was achieved with a 60-degree taper that was extended to a tapered length of 9/16-inch.

One or more anchoring hole(s) 2 penetrates through both top and bottom sides of mounting base 4. Each anchoring hole 2 must create an open space within mounting base 4 so, for illustrative purposes, that air could enter one end of the mounting base, pass through the hole, and exit the other end of the mounting base. Each anchoring hole may be created in any manner, can be of any size, and the ends of each hole, as positioned on the top and bottom planes of the mounting base 4 need not be the same size. But each hole made within mounting base 4 must mate with the bottom part of an anchoring bolt or rod 5 in a manner that produces an appropriate amount of anchoring strength to withstand the forces that the mounted objects and environment will subject upon it. Any method or technology may be employed to mate each anchoring hole 2 with the bottom part of an anchoring bolt or rod 5, so long as the mated strength can withstand the related forces applied. Further, each anchoring hole 2 must penetrate through both the top and bottom sides of the mounting base 4, as further illustrated in FIG. 7 (mounting base 4 top view) and 8 (mounting base 4 bottom view).

There are no requirements for the width or shape of each anchoring hole 2, except for at the top of mounting base 4, the minimum width and shape of each anchoring hole 2 must allow the bottom part of an anchoring bolt or rod 5 to pass through the top of mounting base 4. In the illustrated example, a single anchoring hole 2 was bored out to a circular shape that accepts a standard 16 thread-count bolt that is ⅜-inch in diameter. This anchoring hole 2 fully penetrates through both top and bottom sides of mounting base 4, in a manner that if desired, an individual could pass air into one end of the base, through the center and out the other.

It is important to note the purpose of penetrating the bottom-part of the mounting base 4 with the anchoring hole 2, as illustrated in FIG. 8. By extending at least one anchoring hole 2 through the bottom-part of mounting base 4, two important features are accomplished. First, the chemical bond strength is further enhanced, and second anchoring hole 2 allows for one method of removing the mounting base 4 from its mounted surface area, which will be further detailed below.

At least one anchoring screw, bolt, or rod 5, and/or at least one mounting nut, washer or fastening mechanism 9 is mated with the top part of mounting base 4 in order to perform the anchoring function for mounted and secured equipment or other objects. Any method or technology may be used to mate at least one anchoring screw, bolt or rod 5, and/or at least one mounting nut, washer or fastening mechanism 9 to the mounting base 4. In the illustrated Figures, a standard 16-thread count ⅜-inch hex nut is mated with the anchoring bolt or rod 5 of the same thread-count and bolt diameter, but any quantity, configuration, and combination of nuts, washers, or other fastening mechanisms may be employed to perform the same function.

As illustrated in FIG. 7, mount-enhancing marks 1 may be placed on the top surface of mounting base 4. These mount-enhancing marks 1 can be glued, bonded, molded, prepared, finished, marked, etched, grooved, penetrated or otherwise transformed in any fashion onto the top surface of mounting base 4. Their purpose is to maximize an object's mountability onto the mounting assembly 15 by focusing, concentrating, securing or stabilizing the object onto the mounting base 4.

As illustrated in FIG. 8, bond-enhancing marks 8 are placed on the bottom surface of mounting base 4. These bond-enhancing marks 8 can be molded, prepared, finished, marked, etched, grooved, penetrated or otherwise transformed in any fashion onto the bottom surface of mounting base 4. Their purpose is to focus and leverage the bonding strength of chemical bonding material 12 by increasing the resultant surface area on the faying surface of the mount 4.

A chemical bonding material 12 is applied onto either the bottom surface of mounting base 4, onto the surface area to be used for affixing the mounting base 4, or onto both. The volume of chemical bonding material 12 needed to apply can be of any quantity desired.

If a mounting base 4 needs to be removed from a mounted surface area, there are 3 methods to perform the removal. FIG. 11 illustrates the first of the three ways. In FIG. 11, extreme cold 14 of minus 110 degrees Fahrenheit or lower may be applied to the mounting base 4 for a certain duration of time. This extreme cold weakens the chemical bond properties and allows for human-applied force to break the mounting base 4 apart from the chemical bond material 12. From the illustrated example in FIG. 11, extreme cold 14 in the form of dry ice is being applied atop the mounting base 4 to break the chemical bond strength from chemical bonding material 12. Once the extreme cold has been applied for an appropriate duration of time, a small force-bearing object can break the mounting base 4 apart from the chemical bonding material 12. For example, a hand hammer (not shown) may then strike the mounting base 4, and snap the base off of the chemical bonding material 12. FIG. 13 shows that the mounting base 4 has now been removed from the chemical bonding material 12.

FIG. 12 illustrates the second of the three ways to remove a mounting base 4 from a mounted surface area. In FIG. 12, extreme heat 15 in the form of +300 degrees Fahrenheit or higher may be applied to the mounting base 4 for a certain duration of time. This extreme heat weakens the chemical bond properties and allows for human-applied force to break the mounting base 4 apart from the chemical bond material 12. From the illustrated example in FIG. 12, extreme heat 15 from a heat gun (not shown) is being applied atop the mounting base 4 to weaken the chemical bond strength from chemical bonding material 12. For example, a hand hammer (not shown) may then strike the mounting base 4, and snap the base off of the chemical bonding material 12. FIG. 13 shows that the mounting base 4 has now been removed from the chemical bonding material 12.

Finally, FIG. 14 illustrates the third of the three ways to remove a mounting base 4 from a mounted surface area. In FIG. 14, an anchoring screw, bolt or rod 5 is being screwed or turned inward 16 into mounting base 4 anchoring hole. This method will produce extreme tension force upon the chemical bonding material 12 and break the chemical bond properties, thus also breaking free the mounting base 4 apart from the chemical bond material 12. From the illustrated example in FIG. 14, a person (not shown) is screwing the anchoring bolt or rod 5 in an inward fashion into the mounting base 4 until the mounting base 4 breaks apart from the chemical bonding material 12. FIG. 15 shows that the mounting base 4 and anchoring screw, bolt or rod 5 has now been removed from the chemical bonding material 12.

In addition to the benefits of this invention, as briefly outlined in the Summary section above, this invention also saves time and expense, compared to conventional mounting installation and removal techniques. It eliminates key steps from conventional techniques, which in turn significantly reduces the time and financial cost to mount and remove devices. For example but not limited to, no drills are needed, no drill bits are needed, no steps to repair or patch holes in concrete, no time lost waiting for concrete to dry. In this example, time savings from employing this invention can range from 2 hours to several days, depending on the nature of the conventional techniques employed. And expenses saved can be as much several hundred dollars by eliminating the need for specialized concrete drilling equipment.

This invention also raises the safety of the installation process, and the immediate mounted area post-installation. There is no Personal Protective Equipment needed to install this invention, contrasted with what would be recommended when penetrating into concrete, brick, or steel, or other surface material using conventional mounting methods. There is virtually no debris generated, and virtually no cleanup or waste protocols to follow. There is significantly reduced risk of falling or tripping injury caused by the unused remains from a conventionally mounted device when not properly removed.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A method of mounting items to an object, comprising:
   providing a rigid substantially undeformable mounting base with one or more threaded mounting holes fully penetrating through the rigid substantially undeformable mounting base;
   inserting one or more screws, bolt, studs, rods or other mountable medium into the one or more threaded mounting holes from a top-side of the rigid substantially undeformable mounting base;
   bonding a rigid portion of a bottom-side of the rigid substantially undeformable mounting base to an object using a chemical bonding material, the object not having openings aligned with the one or more threaded mounting holes; and
   removing the rigid substantially undeformable mounting base from the object.

2. The method according to claim 1, wherein the bonding occurs before the inserting.

3. The method according to claim 1, further including affixing a mountable object onto the one or more screws, bolt, studs, rods or other mountable medium after the inserting.

4. The method according to claim 1, wherein removing the rigid substantially undeformable mounting base from the object includes twisting the one or more screws, bolt, studs, rods or other mountable medium inward such that it passes through the bottom side of the rigid substantially undeformable mounting base producing enough force upon the chemical bonding material to separate the rigid substantially undeformable mounting base from the object.

5. The method according to claim 1, wherein removing the rigid substantially undeformable mounting base from the object includes subjecting the chemical bonding material to a heat treatment to weaken chemical bond properties thereof and thereby separate the rigid substantially undeformable mounting base from the object.

6. The method according to claim 5, wherein subjecting the chemical bonding material to a heat treatment includes subjecting the chemical bonding material to at least about 300 degrees Fahrenheit.

7. The method according to claim 1, wherein removing the rigid substantially undeformable mounting base from the object includes subjecting the chemical bonding material to a cold treatment to weaken chemical bond properties thereof and thereby separate the rigid substantially undeformable mounting base from the object.

8. The method according to claim 7, wherein subjecting the chemical bonding material to a cold treatment includes subjecting the chemical bonding material to temperatures below about minus 110 degrees Fahrenheit.

9. The method according to claim 1, wherein the bottom-side is molded, prepared, finished, marked, etched, grooved, penetrated or otherwise transformed in a manner that focuses and leverages a bonding strength of the chemical bonding material.

10. The method according to claim 1, wherein the top-side is glued, bonded, molded, prepared, finished, marked, etched, grooved, penetrated or otherwise transformed to improve the mount-ability of various objects atop the base.

11. The method according to claim 1, wherein the base is a round shape.

12. The method according to claim 11, wherein the top-side of the base is tapered.

13. The method according to claim 1, wherein the base is a polygon shape.

14. The method according to claim 13, wherein the base is a square shape or hexagon shape.

15. A method of mounting items to an object, comprising:
   providing a rigid substantially undeformable mounting base with one or more threaded mounting holes extending into the mounting base, a bottom-side of the rigid substantially undeformable mounting base having a non-natural prepared rough surface;
   inserting one or more screws, bolt, studs, rods or other mountable medium into the one or more threaded mounting holes from a top-side of the rigid substantially undeformable mounting base;
   bonding a rigid portion of the rough surface of the bottom-side of the rigid substantially undeformable mounting base to an object using a chemical bonding material, the object not having openings aligned with the one or more threaded mounting holes; and
   removing the rigid substantially undeformable mounting base from the object.

16. The method according to claim 15, wherein the non-natural prepared rough surface consists of concentric grooves in the bottom-side of the base.

17. The method according to claim 15, wherein the one or more threaded mounting holes fully penetrates through the rigid substantially undeformable mounting base, and further including removing the rigid substantially undeformable mounting base from the object by twisting the one or more screws, bolt, studs, rods or other mountable medium inward such that it passes through the bottom-side of the rigid substantially undeformable mounting base producing enough force upon the chemical bonding material to separate the rigid substantially undeformable mounting base from the object.

18. The method according to claim 15, further including removing the rigid substantially undeformable mounting base from the object by subjecting the chemical bonding material to at least about 300 degrees Fahrenheit.

19. The method according to claim 15, further including removing the rigid substantially undeformable mounting base from the object by subjecting the chemical bonding material to temperatures below about minus 110 degrees Fahrenheit.

* * * * *